United States Patent
Chen

(10) Patent No.: US 7,800,013 B2
(45) Date of Patent: Sep. 21, 2010

(54) LASER DEVICE AND LASER SYSTEM USING SAME

(75) Inventor: Ga-Lane Chen, Santa Clara, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1091 days.

(21) Appl. No.: 11/309,318

(22) Filed: Jul. 26, 2006

(65) Prior Publication Data

US 2007/0108168 A1   May 17, 2007

(30) Foreign Application Priority Data

Nov. 11, 2005   (TW) ............................. 94139782 A

(51) Int. Cl.
*H01S 3/10*   (2006.01)
*B23K 26/00*   (2006.01)

(52) U.S. Cl. ............................. 219/121.62; 372/38.01; 250/205; 219/121.76

(58) Field of Classification Search ..............................
219/121.61–121.72, 121.76, 121.83, 121.85; 250/205; 372/38.01
See application file for complete search history.

(56) References Cited

U.S. PATENT DOCUMENTS

| | | | |
|---|---|---|---|
| 4,769,523 A |   | 9/1988 | Tanimoto et al. |
| 5,430,509 A | * | 7/1995 | Kobayashi ............. 351/221 |
| 5,691,839 A | * | 11/1997 | Kobayashi ............. 359/385 |
| 5,694,408 A | * | 12/1997 | Bott et al. ................. 372/6 |
| 5,759,428 A | * | 6/1998 | Balamane et al. ...... 219/121.66 |
| 5,892,569 A | * | 4/1999 | Van de Velde ............. 351/221 |
| 5,936,764 A | * | 8/1999 | Kobayashi ................. 359/385 |
| 6,256,327 B1 | * | 7/2001 | Goldberg ................... 372/22 |
| 6,547,397 B1 | * | 4/2003 | Kaufman et al. ........... 353/28 |
| 6,674,059 B1 | * | 1/2004 | Nakano .................. 250/201.5 |
| 6,995,841 B2 | * | 2/2006 | Scott et al. ................. 356/318 |
| 7,009,763 B1 | * | 3/2006 | Wolleschensky ........... 359/385 |
| 7,227,625 B2 | * | 6/2007 | Kobayashi et al. .......... 356/73 |
| 7,511,811 B2 | * | 3/2009 | Scott et al. ................. 356/317 |
| 2003/0118060 A1 | * | 6/2003 | Spuehler et al. ............ 372/18 |
| 2004/0138827 A1 | * | 7/2004 | Li et al. ...................... 702/27 |
| 2006/0187499 A1 | * | 8/2006 | Natori et al. ............... 358/474 |
| 2006/0280217 A1 | * | 12/2006 | Zervas et al. ............... 372/72 |

FOREIGN PATENT DOCUMENTS

| | | |
|---|---|---|
| CN | 1405586 A | 3/2003 |
| GB | 1372753 | 11/1974 |

* cited by examiner

*Primary Examiner*—Samuel M Heinrich
(74) *Attorney, Agent, or Firm*—Jeffrey T. Knapp

(57) ABSTRACT

A laser device (10) includes a first laser source (102) for emitting laser beams with a first wavelength, a second laser source (104) for emitting laser beams with a second wavelength, a dichromic beamsplitter (110), and a flexible light waveguide (112). The dichromic beamsplitter is configured for transmitting laser beams emitted from the first laser source and changing a transmission direction of the laser beams emitted from the second laser source. The flexible light waveguide transmits the laser beams from the dichromic beamsplitter, and the flexible light waveguide has a light-input end (114) and a light-output end (116). The light-input end receives the laser beams from the dichromic beamsplitter, and the light-output outputs the laser beams to a workpiece. A laser system (30) using the same is also provided.

12 Claims, 3 Drawing Sheets

LASER DEVICE AND LASER SYSTEM USING SAME

FIELD OF THE INVENTION

The present invention generally relates to a laser device and a laser system using the same for probing and/or patterning a workpiece.

DESCRIPTION OF THE RELATED ART

With development of semiconductor precision optical industry, and appearance of nano material, patterning technologies for precision patterning have been developed. One of the patterning technologies—laser patterning technology—is widely used due to the high monochromaticity, coherence and directivity of laser beams. This makes it possible to create a subwavelength-class structure of workpiece in a workpiece using the laser beams.

Nowadays, a conventional laser device for patterning includes a laser source and a number of lenses. During operation, the laser source emits laser beams, and the laser beams are focused by the lenses directly onto the workpiece. Pulse energy, pulse duration, and pulse repetition of the laser beams are controlled so as to pattern the workpiece properly. However, a patterned surface of the workpiece may be unsatisfactory and the reject rate (i.e. the number of products rejected during quality control) can be high as a result. Moreover, since the laser beams are focused directly onto the workpiece, hard- to-reach areas of the workpiece can prove hard to pattern.

What is needed, therefore, is a laser device, and a laser system probing and/or patterning the workpiece with low reject rates and easy probing and/or patterning.

SUMMARY OF THE INVENTION

A laser device according to one preferred embodiment includes a first laser source for emitting a first laser beam of a first wavelength, a second laser source for emitting a second laser beam of a second wavelength, a dichroic beamsplitter, and a flexible light waveguide. The dichromic beamsplitter is configured for combining the first and second laser beams into a third laser beam consisting of light of the first and second wavelengths. The flexible elongated light waveguide has a light incident end configured for receiving the third laser beam from the dichroic beamsplitter, and a light emitting end configured for emitting the third laser beam.

A laser system for probing and/or patterning a workpiece according to another preferred embodiment includes a laser device mentioned above and a feedback device. The feedback device includes a database, an optical detector, a data analyzer, and a laser controller. The database stores standard reference information therein. The optical detector is configured for receiving the third laser beam reflected from the workpiece and converting optical signals associated with the reflected third laser beam into electrical signals. The data analyzer is configured for receiving the electrical signals, and comparing information contained in the electrical signals with the standard reference information stored in the database, thereby generating a feedback signal. The laser controller is configured for receiving the feedback signal so as to adjustably control the laser device based on the feedback signal.

Advantages and novel features will become more apparent from the following detailed description of the present laser device, and its related laser system, when taken in conjunction with the accompanying drawings.

BRIEF DESCRIPTION OF THE DRAWINGS

Many aspects of the present laser device, its related laser system can be better understood with reference to the following drawings. The components in the drawings are not necessarily drawn to scale, the emphasis instead being placed upon clearly illustrating the principles of the present laser device and its related laser system. Moreover, in the drawings, like reference numerals designate corresponding parts throughout the several views.

DETAILED DESCRIPTION OF THE INVENTION

References will now be made to the drawings to describe preferred embodiments of the present laser device and its related laser system, in detail.

Figure 1:
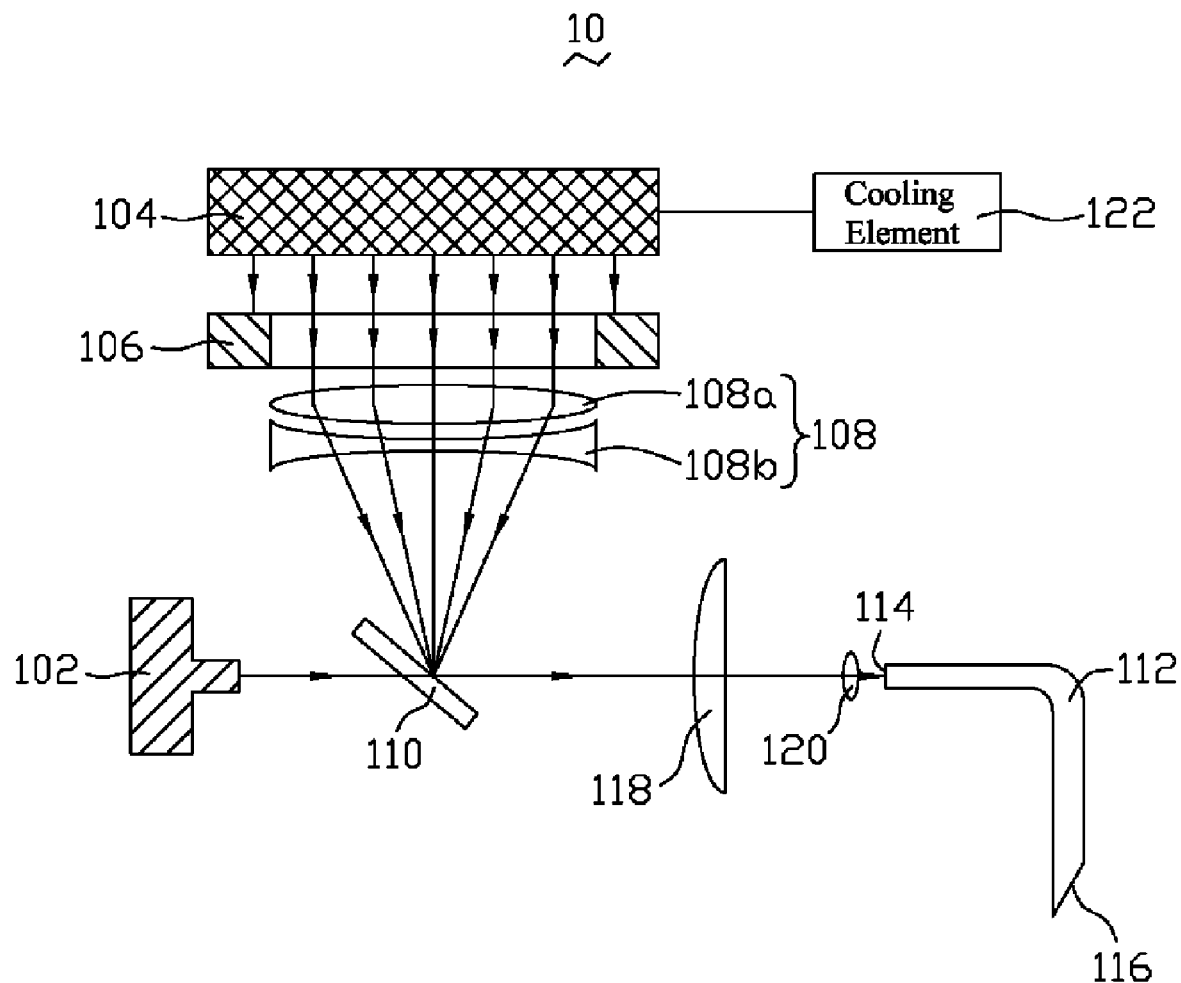
FIG. 1 is an explanatory view of a laser device in accordance with a first preferred embodiment.

Referring to FIG. 1, a laser device 10 in accordance with a first preferred embodiment is shown. The laser device 10 includes a first laser source 102, a second laser source 104, a dichroic beamsplitter 110 and a flexible light waveguide 112.

Preferably, the first laser source 102 is an argon ion laser source for emitting a first laser beam of a first wavelength of about 488 nanometers. In addition, the first laser source 102 may be a helium-neon laser source for emitting first laser beams of a first wavelength of about 632.8 nanometers.

The second laser source 104 is a frequency-double pumped laser source for emitting a second laser beam of a second wavelength of about 532 nanometers. The frequency-double pumped laser source is a neodymium-doped yttrium orthovanadate (Nd:YVO4) laser source or a neodymium-doped yttrium-aluminum garnet (Nd:YAG) laser source, which both emit second laser beams of a second wavelength of about 532 nanometers.

The dichroic beamsplitter 110 is configured for combining the first and second laser beams into a third laser beam consisting of light of the first and second wavelengths. Therefore, two laser beams are combined with each other by the dichroic beamsplitter and transmitted towards the flexible light waveguide 112.

Preferably, a blocking shutter 106 and a lens assembly 108 are both employed between the second laser source 104 and the dichroic beamsplitter 110 in that order. The lens assembly 108 includes a convex lens 108a and a concave lens 108b coaxial with each other. Laser beams emitted from the second laser source 104 pass through the blocking shutter 106, then the convex lens 108a, and the concave lens 108b towards the dichroic beamsplitter 110. A spot size of the laser beams emitted from the second laser source 104 is adjusted by the blocking shutter 106, and a focus of the laser beams emitted from the second laser source 104 is adjusted by the lens assembly 108 so as to focus the laser beams emitted from the second laser source 104 on the dichroic beamsplitter 110.

The flexible light waveguide 112 is configured for transmitting the laser beams exiting from the dichroic beamsplitter 110. The flexible light waveguide 112 has a light-input end 114 and a light-output end 116. The light-input end 114 of the flexible light waveguide 112 receives the laser beams from the dichroic beamsplitter 110 and the light-output end 116 of the flexible light waveguide 112 outputs the laser beams to an object, such as a workpiece. The flexible light waveguide 112 is selected from a group consisting of an optical an fiber, a fiber bundle, and an array waveguide grating (AWG). Preferably, the optical fiber is a single mode optical fiber. Decay of the laser beams in a single mode optical fiber is slower than that in a multi-mode optical fiber. Bandwidth of the single mode optical fiber is wider than that of the multi-mode optical fiber, such that laser beams can travel a long distance without much decay in a single mode optical fiber.

Figure 2:
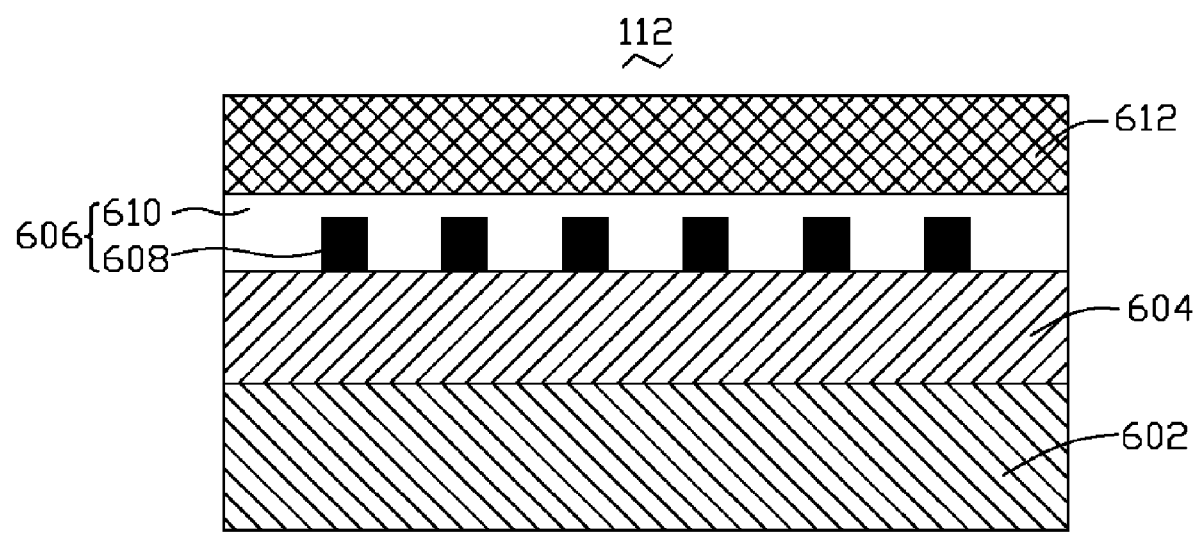
FIG. 2 is a schematic, cross-sectional view of an array waveguide grating for the laser device of the first preferred embodiment.

Referring to FIG. 2, the exemplary array waveguide grating 112 includes four layers: a silicon (Si) or silicon dioxide ($SiO_2$) substrate 602, an ion beam sputtered or ion-plated $SiO_2$ layer 604, a core layer 606, and an ion beam sputtered or ion-plated $SiO_2$ overcoat layer 612.

The thickness of the Si or $SiO_2$ substrate 602 is 0.6 millimeters (mm) to 1 millimeter (mm). The ion beam sputtered or ion-plated $SiO_2$ layer 604 is deposited on the Si or $SiO_2$ substrate 602 with a thickness of 15 to 20 microns (μm). The core layer 606 includes two materials, germanium dioxide ($GeO_2$)-doped $SiO_2$ 608 and a composition 610 of $SiO_2$, phosphorus pentoxide ($P_2O_5$) and boron trioxide ($B_2O_3$), which are both deposited on the ion beam sputtered or ion-plated $SiO_2$ layer 604 by an ion beam sputtering or ion-plating plating. The $GeO_2$-doped $SiO_2$ 608 is in the form of discrete portions, which are isolated from each other by the composition 610. The dimensions of each portion of $GeO_2$-doped $SiO_2$ 608 are 4 to 8 μm wide, and 4 to 8 μm high, and each two adjacent portions of $GeO_2$-doped $SiO_2$ 608 are separated by a distance of about 2 to 4 μm. The thickness of the core layer 606 is about 8 to 16 μm. The overcoat layer 612 is $SiO_2$ deposited on the core layer 606 with a thickness of about 15 to 20 μm by an ion beam sputtering or an ion-plating process as a protective layer to ensure reliability of the AWG 112.

The laser beams in the flexible light waveguide 112, which satisfy a principle of "total internal reflection", are transmitted in a predetermined path set by the flexible light waveguide 112. Since the flexible light waveguide 112 can be bent, the laser beams can reach hard-to-reach areas of the workpiece without breaking off the flexible light waveguide 112.

A light-collecting lens 118 and a convergent lens 120 are placed in that order along a transmission direction of the laser beams between the dichroic beamsplitter 110 and the light-input end 114 of the flexible light waveguide 112 such that the laser beams are further focused at a small spot to enter into the flexible light waveguide 112 through the light-input end 114 thus reducing energy loss.

Moreover, the laser device 10 includes a cooling element 122 with temperature controller to ensure a normal operation of the laser device 10. The cooling element 122 may be a fan with heat pipes and/or heat fins.

By using the flexible light waveguide 112, the laser device 10 can pattern hard-to-reach areas of the workpiece easily. Furthermore, the first laser source 102 is used to probe the workpiece, and the second laser source 104 is used to do patterning or materials removal or material surgery on the workpiece. Therefore, reject rate of the patterned workpieces is reduced.

Figure 3:
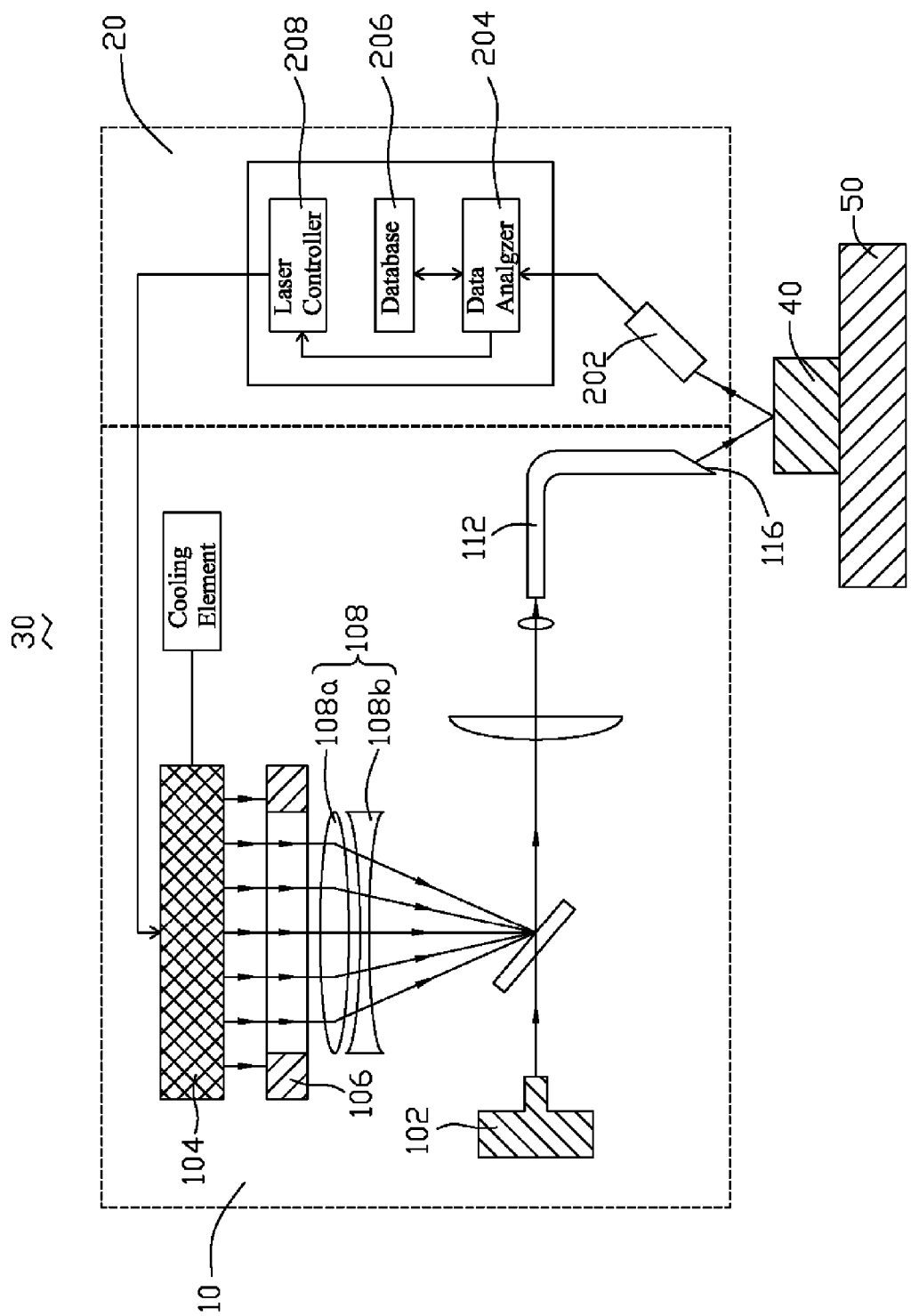
FIG. 3 is an explanatory view of a laser system in accordance with a second preferred embodiment; and Corresponding reference characters indicate corresponding parts throughout the drawings. The exemplifications set out herein illustrate at least one preferred embodiment of the present laser device and its related laser system, in one form, and such exemplifications are not to be construed as limiting the scope of the invention in any manner.

Referring to FIG. 3, a laser system 30 in accordance with a second embodiment is shown. The laser system 30 includes a laser device 10 provided by the first embodiment and a feedback device 20. The feedback device 20 includes a database 206, an optical detector 202, a data analyzer 204 and a laser controller 208. The database 206 stores standard reference information therein, such as the standard reference information of a lens.

A workflow of the laser system 30 is described in detail as below:

The first laser source 102 emits a first laser beam toward the flexible light waveguide 112, and the first laser beam emitted from the first laser source 102 is transmitted in the flexible light waveguide 112 and outputted by the light-output end 116 of the flexible light waveguide 112 to a surface of a workpiece 40 supported by a work stage 50. The optical detector 202 receives the laser beams reflected by the surface of the workpiece 40 as optical signals associated with the reflected laser beams and converts the optical signals into an electrical signal. The data analyzer 204 receives the electrical signals, comparing information contained in the electrical signals with the standard reference information stored in the database 206.

If the information contained in the electrical signals is the same or almost the same as the standard reference information stored in the database 206, then the data analyzer 204 sends a controlling feedback signal to the laser device 10, and the laser device 10 controls the light-output end 116 of the flexible light waveguide 112 to move to another area of the workpiece 40. If the information contained in the electrical signals is different from the standard reference information stored in the database 206, the data analyzer 204 sends another controlling feedback signal to the laser controller 208. The laser controller 208 drives the second laser source 104 to emit laser beams to do patterning on the surface of the workpiece 40. Thus a product is manufactured.

With the feedback device 20, the laser system 30 can do probing and/or patterning on the surface of the workpiece 40 based on the feedback signal, so that a reject rate of the product is reduced and high quality products are produced.

It is to be understood that the above-described embodiment is intended to illustrate rather than limit the invention. Variations may be made to the embodiment without departing from the spirit of the invention as claimed. The above-described embodiments are intended to illustrate the scope of the invention and not restrict the scope of the invention.

What is claimed is:

1. A laser device, comprising:
   a first laser source for emitting a first laser beam of a first wavelength;
   a second laser source for emitting a second laser beam of a second wavelength;
   a dichroic beamsplitter configured for combining the first and second laser beams into a third laser beam of the first and second wavelength;
   a flexible elongated light waveguide having a light incident end configured for receiving the third laser beam from the dichroic beamsplitter, and a light emitting end configured for emitting the third laser beam; and
   a blocking shutter and a lens assembly arranged between the second laser source and the dichroic beamsplitter in that order.

2. The laser device of claim 1, wherein the first laser source is one of an argon ion laser source and a helium-neon laser source.

3. The laser device of claim 1, wherein the second laser source is a frequency-double pumped laser source configured for emitting the laser beam of a wavelength of about 532 nanometers.

4. The laser device of claim 3, wherein the frequency-double pumped laser source is one of a neodymium-doped yttrium vanadate laser source and a neodymium-doped yttrium-aluminum garnet laser source.

5. The laser device of claim 1, wherein the flexible light waveguide is selected from a group consisting of an optical fiber, a fiber array, and an array waveguide grating.

6. The laser device of claim 5, wherein the optical fiber is a single mode optical fiber.

7. The laser device of claim 5, wherein the array waveguide grating comprises a substrate of silicon or silicon dioxide, an ion beam sputtered or ion-plated silicon dioxide layer formed on said substrate, an ion beam sputtered or ion-plated layer comprising a composition and a plurality of discrete germanium dioxide-doped silicon dioxide film portions both formed on the silicon dioxide layer, the composition consisting essentially of a combination of silicon dioxide, phosphorus pentoxide and boron trioxide, the germanium dioxide-doped silicon dioxide film portions being isolated from each other by the composition, and wherein the array waveguide grating further comprises an ion beam sputtered or ion-plated silicon dioxide overcoat layer formed on the composition.

8. The laser device of claim 1, further comprising a light-collecting lens, the light-collecting lens arranged between the dichroic beamsplitter and the flexible light waveguide and configured for coupling the first laser beam into the light incident end of the flexible light waveguide.

9. The laser device of claim 1, wherein the lens assembly comprises a convex lens and a concave lens.

10. A laser system for probing and/or patterning a workpiece, the laser system comprising:
   a laser device, the laser device comprising:
      a first laser source for emitting a first laser beam of a first wavelength;
      a second laser source for emitting a second laser beam of a second wavelength;
      a dichroic beamsplitter configured for combining the first and second laser beams into a third laser beam consisting of light of both the first and second wavelengths;
      a flexible elongated light waveguide having a light incident end configured for receiving the third laser beam from the dichroic beamsplitter, and a light emitting end configured for emitting the third laser beam to the workpiece; and
      a blocking shutter and a lens assembly both located between the second laser source and the dichroic beamsplitter in that order; and
   a feedback device comprising:
      a database storing standard reference information therein;
      an optical detector configured for receiving the third laser beam reflected from the workpiece and converting optical signals associated with the reflected third laser beam into electrical signals;
      a data analyzer configured for receiving the electrical signals, and comparing information contained in the electrical signals with the standard reference information stored in the database, thereby generating a feedback signal; and
      a laser controller configured for receiving the feedback signal so as to adjustably control the laser device based on the feedback signal.

11. The laser system of claim 10, wherein the flexible light waveguide is an array waveguide grating.

12. The laser system of claim 11, wherein the array waveguide grating comprises a substrate of silicon or silicon dioxide, an ion beam sputtered or ion-plated silicon dioxide layer formed on said substrate, an ion beam sputtered or ion-plated layer comprising a composition and a plurality of discrete germanium dioxide-doped silicon dioxide film portions both formed on the silicon dioxide layer, the composition consisting essentially of a combination of silicon dioxide, phosphorus pentoxide and boron trioxide, the germanium dioxide-doped silicon dioxide film portions being isolated from each other by the composition, and wherein the array waveguide grating further comprises an ion beam sputtered or ion-plated silicon dioxide overcoat layer formed on the composition.

* * * * *